(12) United States Patent
Fujita

(10) Patent No.: US 10,103,409 B2
(45) Date of Patent: Oct. 16, 2018

(54) LEAD-ACID BATTERY, MANUFACTURING METHOD OF THE SAME, AND LID MEMBER FOR LEAD-ACID BATTERY

(71) Applicant: GS Yuasa International Ltd., Kyoto-shi, Kyoto (JP)

(72) Inventor: Sosuke Fujita, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 82 days.

(21) Appl. No.: 14/573,889

(22) Filed: Dec. 17, 2014

(65) Prior Publication Data

US 2015/0171479 A1    Jun. 18, 2015

(30) Foreign Application Priority Data

Dec. 18, 2013  (JP) ................. 2013-261554

(51) Int. Cl.
   *H01M 10/12*   (2006.01)
   *H01M 2/04*    (2006.01)
   *H01M 2/02*    (2006.01)

(52) U.S. Cl.
   CPC .......... *H01M 10/12* (2013.01); *H01M 2/043* (2013.01); *H01M 2/0439* (2013.01); *H01M 2/0473* (2013.01); *H01M 2/0242* (2013.01); *Y02E 60/126* (2013.01); *Y02P 70/54* (2015.11)

(58) Field of Classification Search
   CPC .... H01M 10/121; H01M 2/04; H01M 2/0439; H01M 2/0473; H01M 2/08; H01M 2/0242
   See application file for complete search history.

(56) References Cited

U.S. PATENT DOCUMENTS

| 1,703,735 | A |   | 2/1929 | Holland |
| 3,276,913 | A | * | 10/1966 | Sabatino ............. H01M 2/0439 220/526 |
| 2005/0238955 | A1 |   | 10/2005 | Hooke |

FOREIGN PATENT DOCUMENTS

| EP | 2693528 | * | 2/2014 |
| JP | 46-1851 |   | 1/1971 |
| JP | 56-52854 |   | 5/1981 |
| JP | 09-251850 |   | 9/1997 |
| JP | 2000048774 A2 |   | 2/2000 |
| JP | 2003-142041 |   | 5/2003 |
| JP | 2004-311318 |   | 11/2004 |

OTHER PUBLICATIONS

Extended European Search Report dated May 13, 2015 issued in the corresponding European patent application No. 14198314.8.

* cited by examiner

*Primary Examiner* — Ula C Ruddock
*Assistant Examiner* — Thomas H. Parsons
(74) *Attorney, Agent, or Firm* — Rankin, Hill & Clark LLP

(57) ABSTRACT

A lead-acid battery including: a power generating element, a container accommodating the power generating element a lid member having a rib joined to an outer wall of the container and sealing an opening of the container; an outer peripheral wall provided at the lid member, located to be spaced apart from the rib, and surrounding the outer wall of the container; and a spacer located between the outer wall of the container and the outer peripheral wall of the lid member.

20 Claims, 10 Drawing Sheets

LEAD-ACID BATTERY, MANUFACTURING METHOD OF THE SAME, AND LID MEMBER FOR LEAD-ACID BATTERY

CROSS-REFERENCE TO RELATED APPLICATIONS

This application claims the benefit of Japanese patent application No. 2013-261554, filed on Dec. 18, 2013, which is incorporated by reference.

FIELD

The present invention relates to a technique for preventing positional displacement between a container and a lid member.

BACKGROUND

As described in JP 2003-142041 A, an exemplary lead-acid battery includes a container and a lid member that is thermally welded to the container so as to seal the container. The lid member is thermally welded to the container in the following manner. Facing portions of the container and the lid member are initially heated using a heated iron plate. The lid member is subsequently placed on the container so that the facing portions thus heated abut against each other, and the container and the lid member are then pressed against each other. The facing portions of the container and the lid member are thus coupled together, and the lid member is thermally welded, for example, so as to be joined to the container.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

When a container and a lid member are pressed, a container 200 is occasionally strained by bulging as indicated by arrows G in FIG. 10 and an outer wall 210 of the container 200 is positionally displaced with respect to the lid member. This causes a problem of insufficient joint between the container and the lid member.

The present invention has been made in of the circumstance described above, and an object thereof is to prevent positional displacement between a container and a lid member upon joining.

A lead-acid battery disclosed in this specification includes: a power generating element, a container accommodating the power generating element; a lid member having a rib joined to an outer wall of the container and sealing an opening of the container; an outer peripheral all located to be spiced apart from the rib and surrounding the outer wall of the container; and a spacer located between the outer wall of the container and the outer peripheral wall of the lid member.

The lead-acid battery disclosed in this specification can suppress the container from being strained by considerably bulging outward. Positional displacement of the outer wall of the container can be accordingly suppressed with respect to the rib formed at the lid member, and the container and the lid member can be securely joined to each other.

BRIEF DESCRIPTION OF DRAWINGS

The foregoing and other features of the present invention will become apparent from the following description and drawings of an illustrative embodiment of the invention in which.

Figure 1:
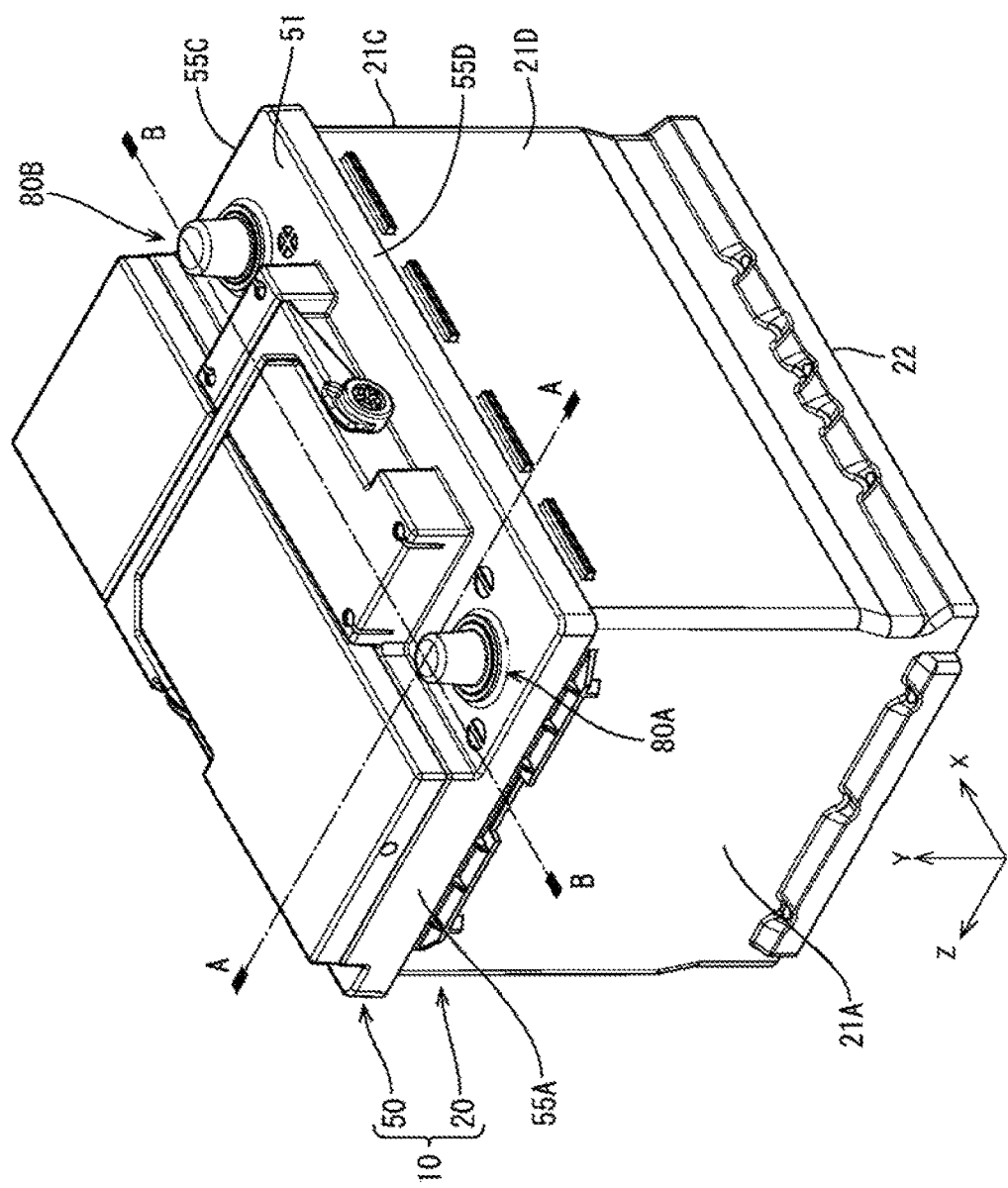
FIG. 1 is a perspective view of a lead-acid battery according to an embodiment 1 of the present invention.

DESCRIPTION OF EMBODIMENTS (Summary of the Present Embodiment)

A summary of a lead-acid battery according to the present embodiment is described initially. The lead-acid battery includes: a power generating element, a container accommodating the power generating element; a lid member having a rib joined to an outer wall of the container and sealing an opening of the container; an outer peripheral wall provided at the lid member, located to be spaced apart from the rib, and surrounding the outer wall of the container; and a spacer located between the outer wall of the container and the outer peripheral wall of the lid member. In this configuration, when the container is strained by bulging outward, the spacer located in a dead space between the outer wall of the container and the outer peripheral wall of the lid member comes into contact with the outer wall of the container and the outer peripheral wall of the lid member to regulate such strain of the container. Positional displacement of the outer wall of the container can be accordingly suppressed with respect to the rib formed at the lid member, and the container and the lid member can be securely joined to each other.

In the lead-acid battery, the spacer is provided on at least one of the outer wall of the container and the outer peripheral wall of the lid member, and is configured to contact another one of the members when the container is strained by bulging outward. In this configuration, the spacer is provided on at least one of the outer wall of the container and the outer peripheral wall of the lid member, and is thus suppressed from being detached. The spacer has a contact surface with the other member, and the contact surface is preferably perpendicular to a strain direction of the container. Such a perpendicular contact surface can receive strain of the container more reliably than a slant contact surface, and can accordingly suppress a strain amount of the container. The outer wall of the container can be thus suppressed from being positionally displaced with respect to the rib formed at the lid member.

In the lead-acid battery, the container includes a plurality of cell chambers aligned in a certain direction and divided by a partition, and the spacer is provided correspondingly to the outer wall at each end in the certain direction of the container. In this configuration, the outer wall not connected with a partition of the container is more likely to bulge outward than the outer wall connected with a partition. The spacer is thus preferably provided so as to correspond to a portion likely to bulge outward on the outer wall.

In the lead-acid battery, the outer wall of the container and the rib of the lid member are welded to be joined to each other, the spacer has a contact portion configured to contact the other member, and the contact portion is provided at a position distant from a joint portion between the outer all of the container and the rib in an extending direction of the outer wall of the container. In this configuration, the contact portion comes into contact with the opposing member at the position distant from the joint portion between the outer wall of the container and the rib when the container is strained. The portion at such a position distant from the distal end of the outer wall of the container is low in temperature and the material at the position is hard even upon welding. The material at such a hard site is not plastically strained by itself upon contact, and the container can be thus suppressed in strain amount.

In the lead-acid battery, the spacer is provided inside the outer peripheral wall of the lid member. The spacer is provided at the lid member in this configuration. The spacer is thus hidden by the outer peripheral wall of the lid member so as not to be exposed outside. The spacer is less likely to be damaged by interfering with a different component or the like during assembly work and delivery, for example.

In the lead-acid battery, the spacer has a contact portion configured to contact the other member, and the contact portion of the spacer is formed in a width of the rib. Strain of the outer wall of the container is regulated in the width of the rib in this configuration. The outer wall of the container can be thus suppressed from being detached from the rib.

In the lead-acid battery, the spacer has end surfaces facing the outer wall of the container, the end surfaces includes a plurality of surfaces having different angles in the extending direction of the outer wall of the container, and the plurality of surfaces includes: a contact surface configured to contact the outer wall of the container; and a slant surface having an angle different from the angle of the contact surface and slanted toward the rib. Strain of the container can be regulated by the contact surface in this configuration. The slant surface guides the outer wall of the container toward the rib of the lid member. The outer wall of the container can be thus positioned with respect to the rib of the lid member. In other words, the single spacer can regulate strain of the container as well as position the container with respect to the lid member.

In the lead-acid battery, the slant surface has a first end connected to the contact surface, and the slant surface has a second end connected to a surface of the rib joined to the outer wall. This configuration can smoothly achieve regulation on strain of the container as well as positioning of the container with respect to the lid member.

A method of manufacturing the lead-acid battery includes welding to join the outer wall of the said container and the rib of the lid member. In this manufacturing method, when the container is strained by bulging outward, the spacer located in the dead space between the outer wall of the container and the outer peripheral wall of the lid member comes into contact. with the outer all of the container and the outer peripheral wall of the lid member to regulate such strain of the container. Positional displacement of the outer wall of the container can be accordingly suppressed with respect to the rib formed at the lid member, and the container and the lid member can be securely joined to each other.

A lid member for sealing an opening of a lead-acid battery container includes a base portion; an outer peripheral wall formed along an outer peripheral edge of the base portion; a rib located to be spaced apart from the outer peripheral wall and surrounded by the outer peripheral wall; and a spacer located between the rib and the outer peripheral wall of the lid member. In this configuration, when the container is strained by bulging outward, the spacer located in a dead space between the outer all of the container and the outer peripheral wall of the lid member comes into contact with the outer wall of the container and the outer peripheral wall of the lid member to regulate such strain of the container. Positional displacement of the outer wall of the container can be accordingly suppressed with respect to the rib formed at the lid member, and the container and the lid member can be securely joined to each other.

In the lid member, the spacer is disposed on an inner surface of the outer peripheral wall, the inner surface being opposed to the rib, and the spacer comprises a slant surface slanted toward the rib and a contact surface having an angle different from an angle of the slanted surface, the contact surface being configured to contact the lead-acid battery container. Strain of the container can be regulated by the contact surface in this configuration. The slant surface guides the outer wall of the container toward the rib of the lid member. The outer wall of the container can be thus positioned with respect to the rib of the lid member. In other words, the single spacer can regulate strain of the container as well position the container with respect to the lid member.

<Embodiment 1>

The embodiment 1 is described with reference to FIGS. 1 to 8.

1. Structure of Lead-acid Battery 10

Figure 2:
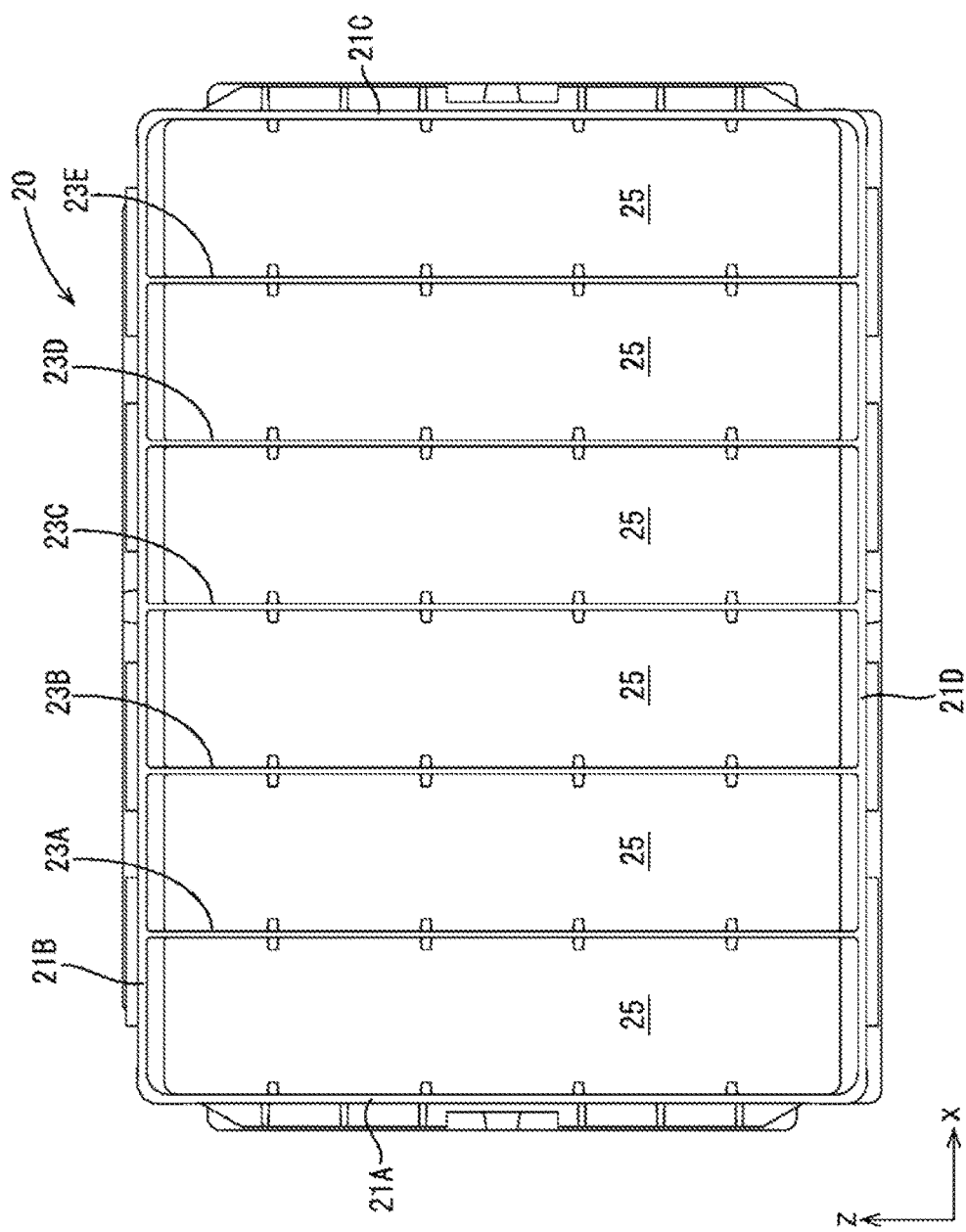
FIG. 2 is a plan view of a container.
Figure 3:
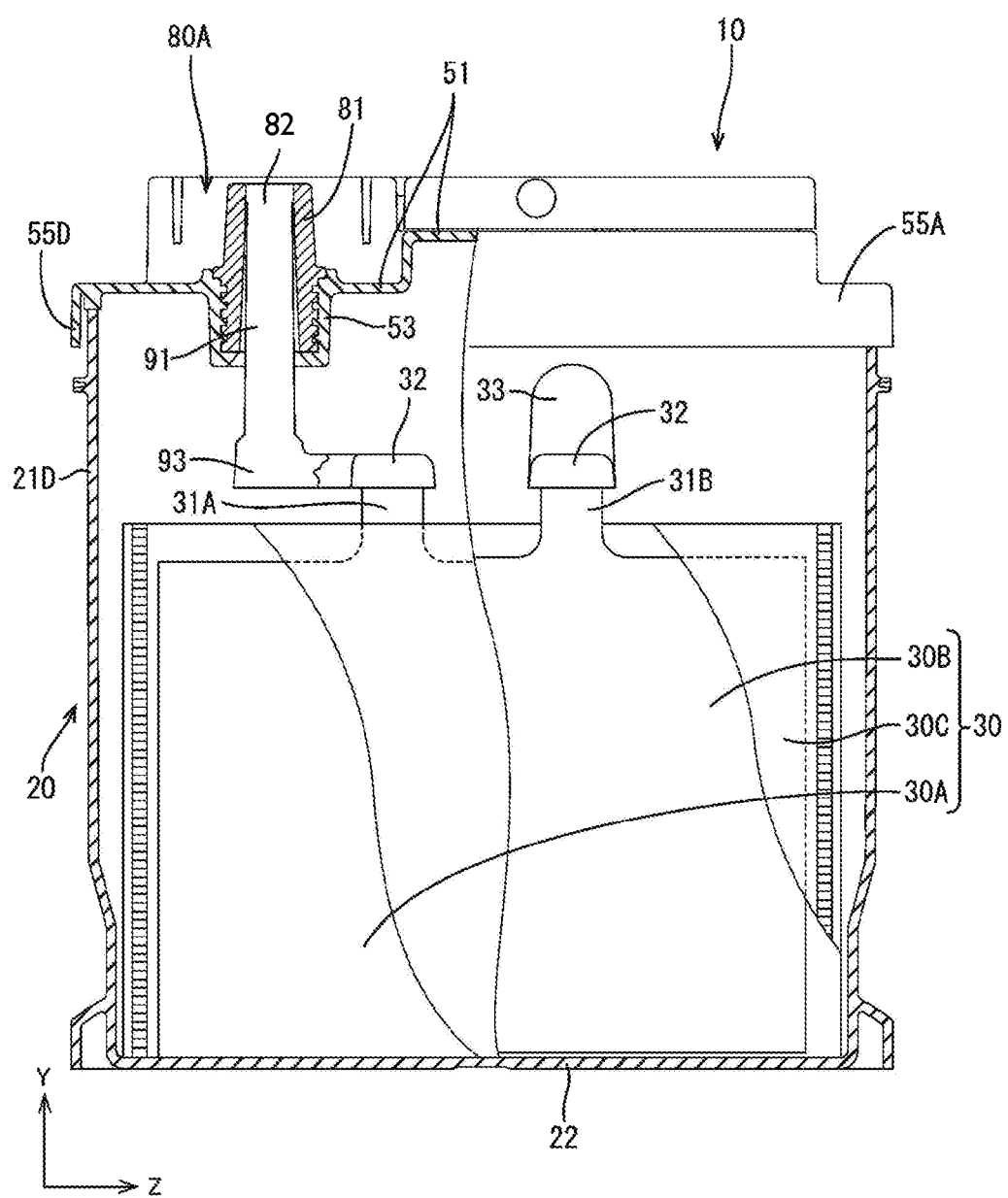
FIG. 3 is a vertical sectional view of the lead-acid battery (a sectional view taken along line A-A in FIG. 1)
Figure 4:
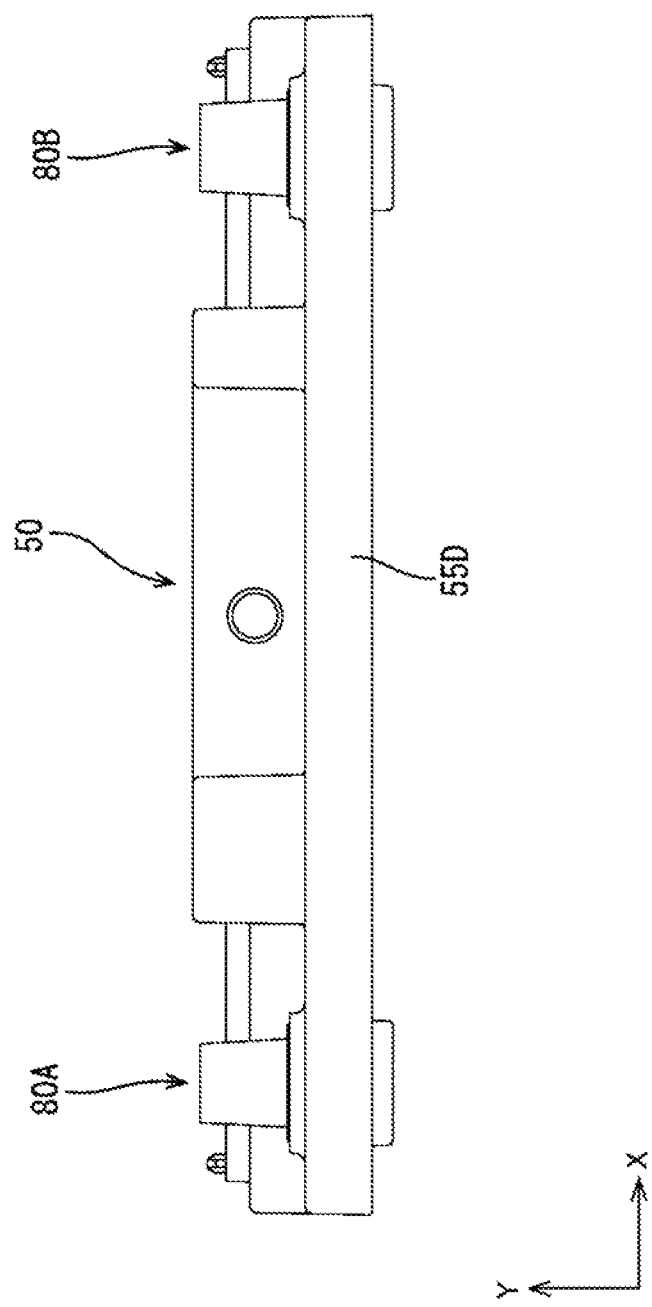
FIG. 4 is a front view of a lid member.

As shown in FIGS. 1 to 3, the lead-acid battery 10 includes a container 20, elements 30 each functioning as a power generating element, and a lid member 50. In the following description, an array direction of cell chambers 25 (a transverse width direction of the container 20) is called an X direction and a direction perpendicular to the array direction of the cell chambers 25 (a depth direction of the container 20) is called a Z direction. Furthermore, an extending direction of an outer wall 21 (a height direction of the container) is called a Y direction. The extending direction of the outer wall 21 corresponds to a direction extending from a bottom wall 22 of the container 20 toward the distal end of the outer wall.

The container 20 is made of synthetic resin. The container 20 has four outer walls 21A to 21D and the bottom wall 22, and has a box shape with an open top surface. As shown in FIG. 2 the container 20 has the interior divided into a plurality of cell chambers 25 by partitions 23A to 23E that are formed at substantially equal intervals in the X direction. There are six cell chambers 25 in the X direction the transverse width direction of the container) in FIG. 2, and the cell chambers 25 each accommodate the corresponding element 30 as well as electrolyte solution.

As shown in FIG. 3, the element 30 includes a positive plate 30A, a negative plate 30B, and a separator 30C dividing the electrode plates 30A and 30B. The electrode plates 30A and 30B each have a grid filled with an active material, and are provided at the tops with ears 31A and 31B, respectively. The ears 31A and 31B are provided to couple the electrode plates 30A and 30B having same polarity by way of straps 32 in the cell chambers 25.

The straps 32 each have a long plate shape in the X direction or the like, and each of the cell chambers 25 is provided with two straps 32 in a pair for a positive electrode and a negative electrode. The straps 32 for the positive electrode and the negative electrode in the adjacent cell chambers 25 are electrically connected with each other by way of connectors 33 provided on the straps 32, so that the elements 30 in the cell chambers 25 are connected in series.

The lid member 50 is made of synthetic resin, and includes a base portion 51 sealing the upper surface of the container 20, and outer peripheral walls 55A to 55D (collectively denoted by reference numeral 55) formed along the outer peripheral edge of the base portion 51.

The outer peripheral walls 55A to 55D extend downward from the outer peripheral edge of the base portion 51. The outer peripheral walls 55A to 55D are spaced apart from ribs 61A to 61D to be joined to the outer walls 21A to 21D and surround the upper ends of the outer walls 21A to 21D with a space G (see FIG. 7).

As shown in FIG. 1, the lid member 50 is provided with a positive electrode terminal 80A and a negative electrode terminal 80B near respective ends in the X direction. The positive electrode terminal 80A is structured identically to the negative electrode terminal 80B. The structure of the positive electrode terminal 80A is exemplarily described below.

The positive electrode terminal 80A has a bush 81 and a pole 91. The bush 81 is made of metal such as lead alloy and has a hollow cylindrical shape. As shown in FIG. 3, the bush 81 penetrates a cylindrical mount 53 that is formed integrally with the base portion 51 of the lid member 50, and has an upper half protruding from the upper surface of the base portion of the lid member 50. The upper half of the bush 81 exposed from the upper surface of the base portion of the lid member 50 functions as a terminal connector and is assembled with a connecting terminal (not shown) such as a harness terminal.

The lid member 50 is formed integrally with the bush 81 by pouring resin into a mold to which the bush 81 is inserted. The mount 53 is thus provided integrally with the bush 81 and covers the lower outer periphery of the bush 81 with no space being provided therebetween.

The pole 91 is made of metal such as lead alloy and has a columnar shape. The pole 91 is inserted to the bush 81 from downward. The pole 91 has an upper end 82 joined by welding to the bush 81, and a base end 93 joined to the strap 32 of the element 30.

Figure 5:
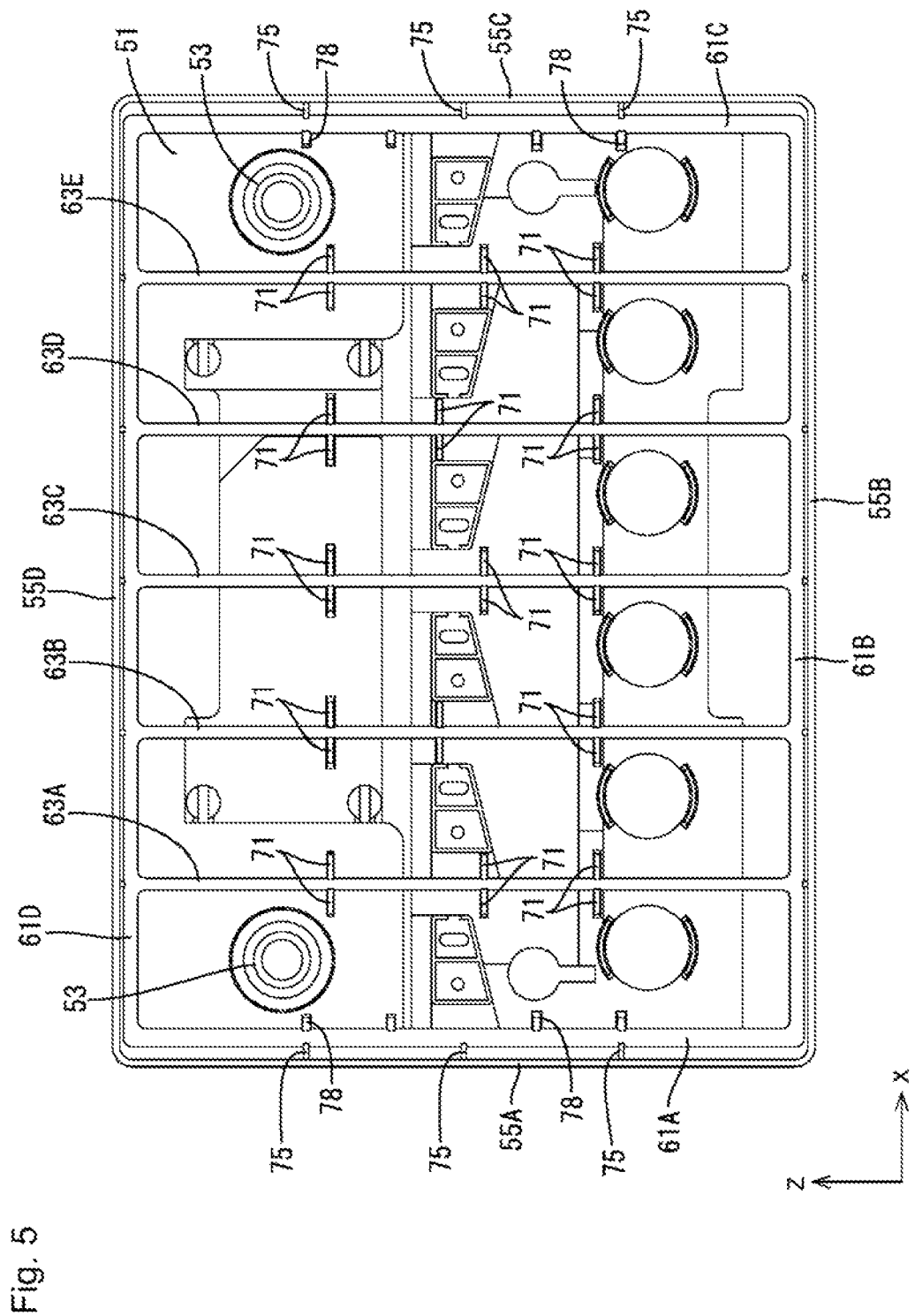
FIG. 5 is a bottom view of the lid member.

As shown in FIG. 5, the lid member 50 has to rear surface provided with the ribs 61A to 61D and lid partitions 63A to 63E. The ribs 61A to 61D are projections each having a predetermined width and protruding downward from the rear surface of the lid member 50, and are provided so as to correspond to the outer walls 21A to 21D of the container 20. The lid partitions 63A to 63E are walls each having a predetermined width and protruding downward from the rear surface of the lid member 50, and are provided so as to correspond to the partitions 23A to 23E of the container 20.

The ribs 61A to 61D have the lower end surfaces abutting against the upper end surfaces of the outer walls 21A to 21D of the container 20 whereas the lid partitions 63A to 63E have the lower end surfaces abutting against the upper end surfaces of the partitions 23A to 23E of the container 20.

Figure 6:
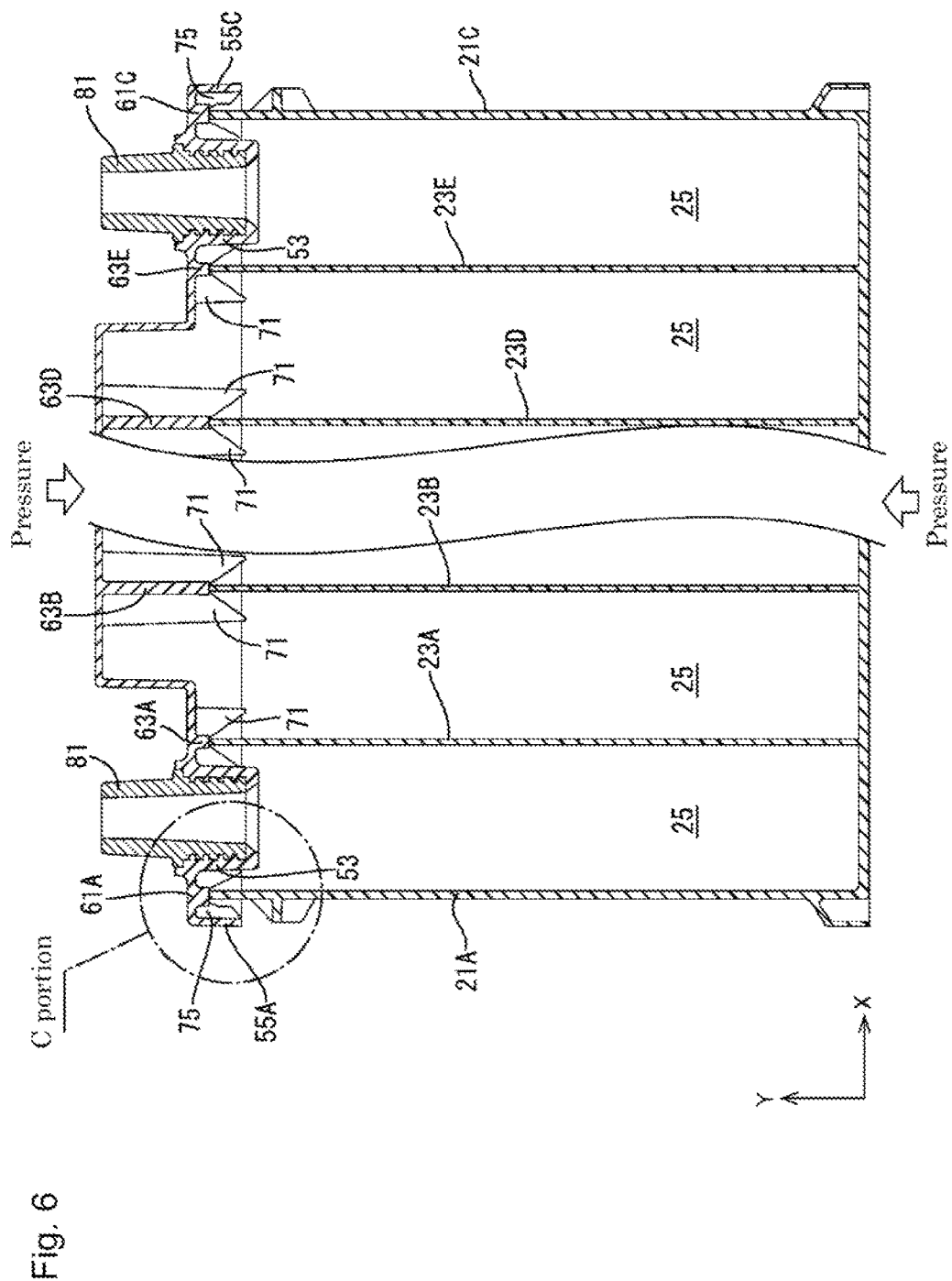
FIG. 6 is a vertical sectional view of the lead-acid battery (a sectional view taken along line B-B in FIG. 1)

As shown in FIG. 6, the rib 61 has a transverse width (dimension in the X direction) larger than a transverse width (dimension in the X direction) of the outer wall 21, and the lid partition 63 has a transverse width (dimension in the X direction) larger than a transverse width (dimension in the X direction) of the partition 23. Such setting achieves a structure that prevents detachment of the outer wall 21 or the partition 23 from the rib 61 or the lid partition 63 even when the container 20 is slightly displaced in the X direction with respect to the lid member 50 upon assembling.

The ribs 61A to 61D of the lid member 50 and the outer walls 21A to 21D of the container 20 are thermally welded, respectively, and the lid partitions 63A to 63E of the lid member 50 and the partitions 23A to 23E of the container 20 are thermally welded, respectively. This achieves the structure in which the cell chambers 25 of the container 20 are sealed. Thermal welding is performed b heating, with an iron plate, the upper end surfaces of the outer walls 21 and the partitions 23 of the container 20 and the lower end surfaces of the ribs 61 and the lid partitions 63 of the lid member 50, and then placing the lid member 50 on the container 20 and pressing from above and below (see FIG. 6).

The lead-acid battery 10 is further provided with guide pieces 71 and strain regulating pieces 75. The strain regulating piece 75 exemplifies the "spacer" according to the present invention.

As shown in FIG. 5, the guide pieces 71 are provided on both of the left and the right of each of the lid partitions 63A to 63E on the rear surface of the lid member 50. The guide pieces 71 are provided at three positions in the depth direction (the Z direction) of each of the lid partitions 63A to 63E.

As shown in FIG. 6, the left and right guide pieces 71 form a guide groove having a V shape and guiding the partition 23 of the container 20 to the lid partition 63 of the lid member 50, and have a function of positioning the partition 23 of the container 20 with respect to the lid partition 63 of the lid member 50 upon assembling.

As shown in FIG. 5, the strain regulating pieces 75 are provided on the two outer peripheral walls 55A and 55C located at the respective ends in the array direction (the X direction) of the cell chambers 25 out of the outer peripheral walls 55A to 55D of the lid member 50. Specifically, the strain regulating pieces 75 are provided at three positions in the Z direction in FIG. 5, on each of the two outer peripheral walls 55A and 55C. The X direction corresponds to the "a certain direction" according to the present invention, and the two outer peripheral walls 55A and 55C located at the respective ends in the X direction correspond to "outer walls at respective ends in the certain direction of the container" according to the present invention.

Figure 7:
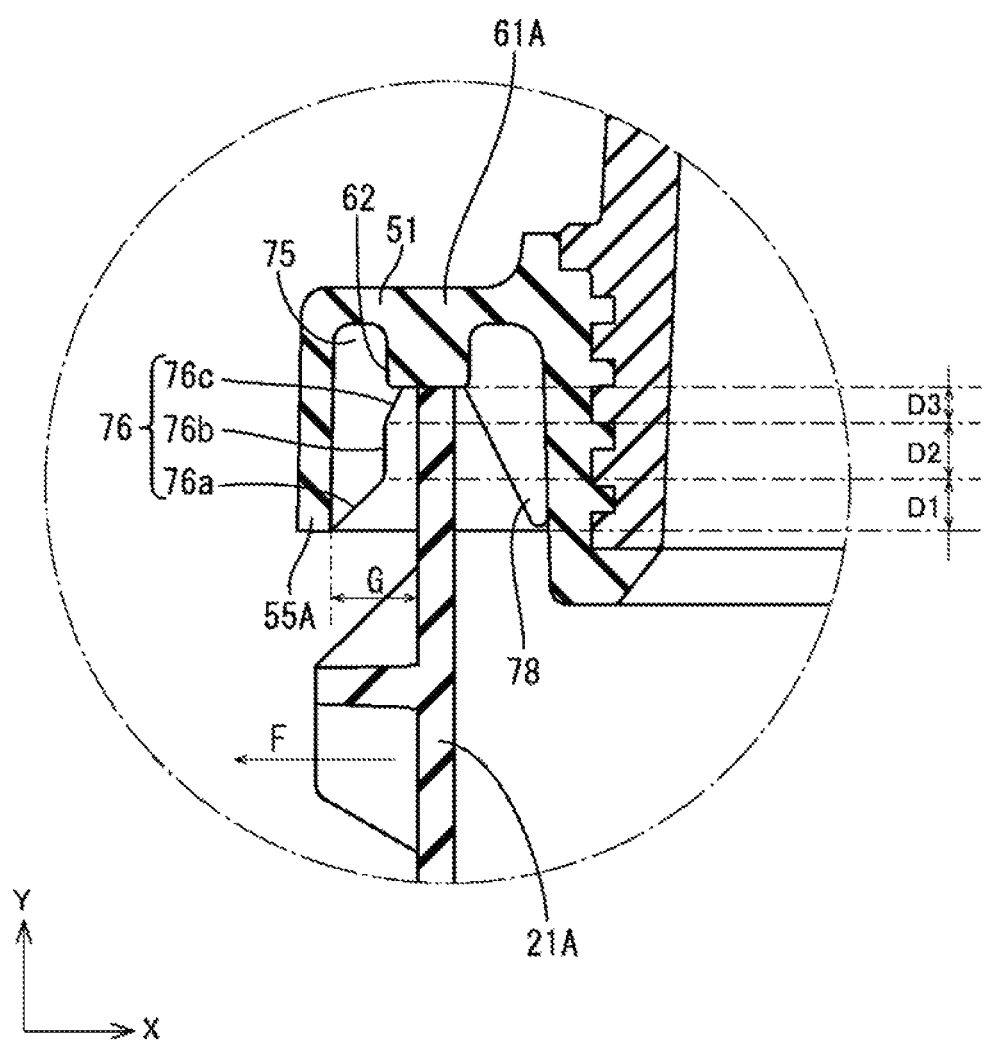
FIG. 7 is an enlarged view of a C portion in FIG. 6.

As shown in FIG. 7, the strain regulating pieces 75 are each formed on the inner surface of the outer peripheral wall 55A and have a plate shape. The strain regulating pieces 75 are formed to extend over both surfaces of the outer peripheral wall 55A and the base portion 51 of the lid member 50. Each of the strain regulating pieces 75 protrudes from the inner surface of the outer peripheral wall 55A toward the outer wall 21A of the container 20, and has end surfaces 76 that face the outer wall 21A of the container 20 and include a plurality of surfaces having different angles in the extending direction (the Y direction) of the outer wall 21. Specifically, the end surfaces 76 include a first slant surface 76a, a vertical surface 76b, and a second slant surface 76c from below in this order. The vertical surface 76a exemplifies the "contact surface" or the "contact portion" according to the present invention.

The first slant surface 76a is slanted from the lower end of the outer peripheral wall 55 of the lid member 50 toward the rib 61A formed at the lid member 50. The first slant surface 76a has a guide function of guiding the outer wall 21A of the container 20 to the position of the rib 61A when the lid member 50 is assembled to the container 20. The first slant surface 76a is formed in a range D1 indicated in FIG. 7, and the vertical surface 76b is formed continuously from the first slant surface 76a.

The vertical surface 76b is vertical to the transverse width direction (the X direction) of the container 20, and parallelly face the outer wall 21A of the container 20. The vertical surface 76b has a function of regulating strain of the container 20 upon thermal welding.

Figure 8:
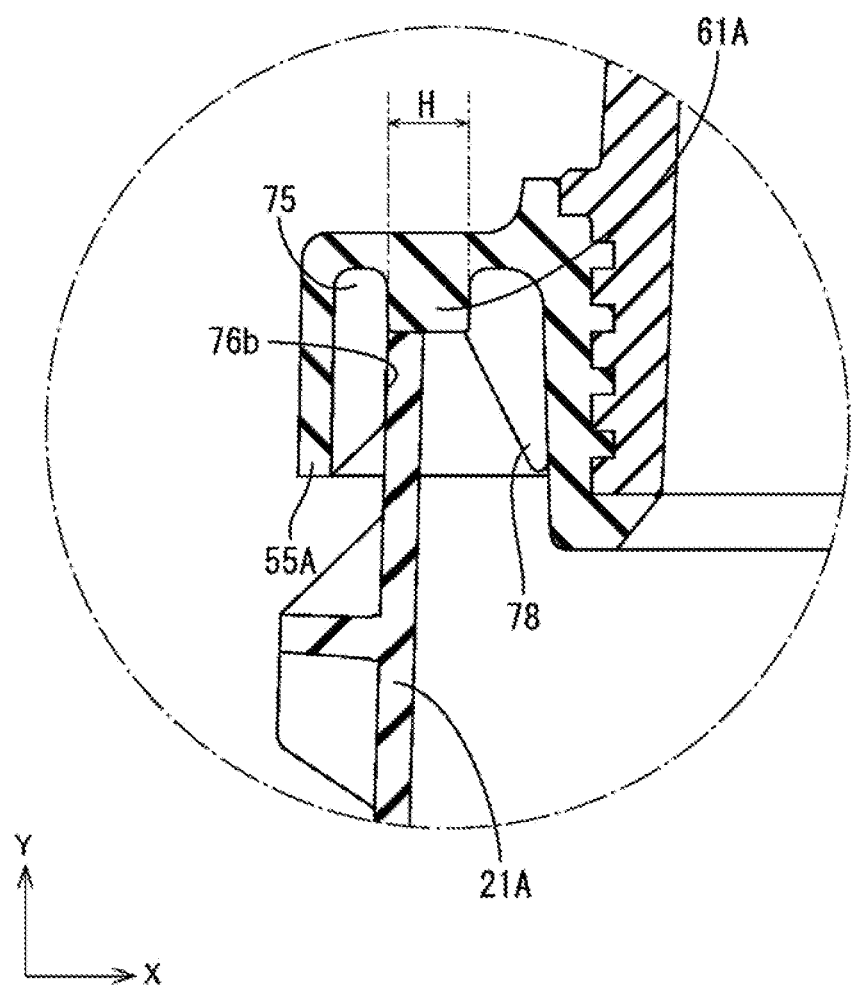
FIG. 8 is an enlarged view of the C portion in FIG. 6 (showing a state where an outer wall of the container planarly abuts against a parallelly facing portion)
Figure 10:
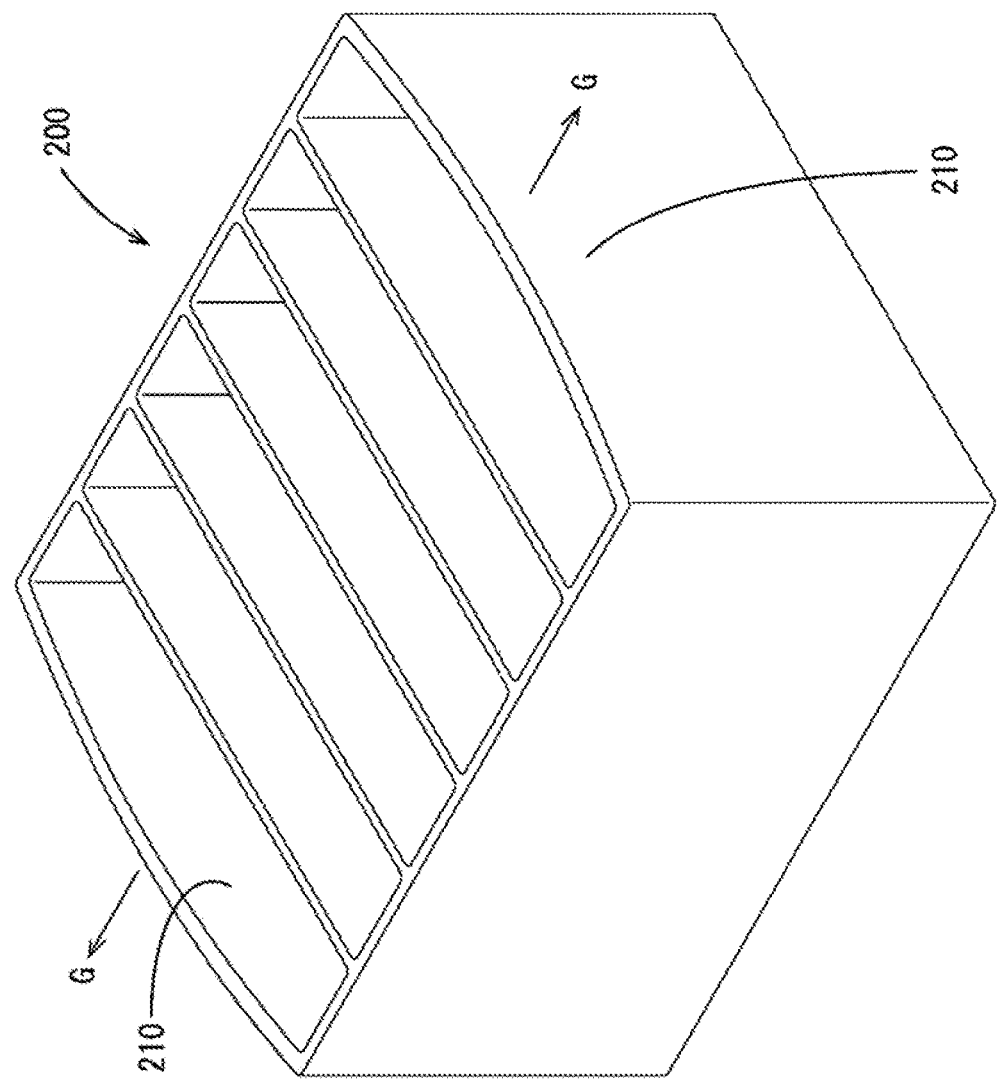
FIG. 10 is a perspective view of the container (showing a strained state).

Specifically, the outer walls 21 of the container 20 are strained by bulging when the container 20 and the lid member 50 are pressed from above and below so as to be welded (see FIG. 10). As shown in FIG. 8, the outer wall 21A thus strained planarly abuts against the vertical surface 76b, so that further strain of the outer wall 21A can be regulated. The vertical surface 76b, which is vertical to the strain direction (an F direction in FIG. 7) of the outer wall 21A, can receive the outer wall 21A more reliably than a slant surface, so as to suppress the strain amount of the outer wall 21A. Similarly, the vertical surfaces 76b of the strain regulating pieces 75 provided on the outer peripheral wall 55C of the lid member 50 can regulate strain of the out wall 21C.

Furthermore, as shown in FIG. 7, the vertical surface 76b is located vertically below an end edge 62 of the rib 61A and is set such that the position of the vertical surface 76b in the X direction matches the end edge 62 of the rib 61A. Such dimensional relation causes the outer wall 21A of the container 20 to planarly abut against the vertical surface 76b in the width (indicated as an H dimension in FIG. 8) of the rib 61A, as shown in FIG. 8. The outer wall 21A is not detached from the rib 61A upon thermal welding, and the outer wall 21A of the container 20 and the rib 61 of the lid member 50 can be securely joined to each other.

The vertical surface 76b is formed in a range D2 indicated in FIG. 7, and the second slant surface 76c is formed continuously from the vertical surface 76b. The second slant surface 76c is formed in a range D3 indicated in FIG. 7. The second slant surface 76c is slanted toward the rib 61A formed on the lid member 50, and has a base end (first end) connected to the vertical surface 76b and a distal end (second end) connected to the lower end surface of the rib 61A. Similarly to the first slant surface 76a, the second slant surface 76c has a guide function of guiding the outer wall 21A of the container 20 to the position of the rib 61A when the lid member 50 is assembled to the container 20. The lower end surface of the rib 61A corresponds to a "surface joined to the outer wall 21" according to the present invention.

As shown in FIG. 7, the lid member 50 is provided with a guide piece 78 that opposes the strain regulating piece 75 with the rib 61A being interposed therebetween. The guide piece 78 is slanted toward the rib 61A, and has a function of positioning the outer wall 21A of the container 20 and the rib 61A when the lid member 50 is assembled to the container 20, similarly to the first slant surface 76a and the second slant surface 76c of the strain regulating piece 75.

2. Method of Manufacturing Lead-acid Battery 10

Manufacture of the lead-acid battery 10 initially includes the step of inserting the element 30 to each of the cell chambers 25 of the container 20. The manufacture subsequently includes the step of connecting the connector bodies 33 provided on the straps 32 of the cell chambers 25. The elements 30 of the cell chambers 25 are thus brought into the state of being connected in series.

After the completion of the step of connecting the connector bodies 33, the step of joining the lid member 50 to the container 20 is executed. As described earlier, the step of joining the lid member 50 includes initially heating, with an iron plate, the upper end surfaces of the outer walls 21 and the partitions 23 of the container 20 as well as the lower end surfaces of the ribs 61 and the lid partitions 63 of the lid member 50. This step includes subsequently placing the lid member 50 on the container 20 and pressing from above and below The outer walls 21 of the container 20 and the ribs 61 of the lid member 50 are welded accordingly. Furthermore, the partitions 23 of the container 20 and the lid partitions 63 of the lid member 50 are welded. The lid member 50 is thus joined to the container 20.

Subsequently executed are the step of injecting the electrolyte solution into the container 20 through a liquid port (located outside the drawing) formed at the lid member 50, the step of welding the bushes 81 and the distal ends of the poles 91, and the like, to complete the lead-acid battery 10.

3. Description of Effects

When the container 20 is strained by bulging outward upon thermal welding in the lead-acid battery 10, the vertical surface 76b of each of the strain regulating pieces 75 comes into contact with the outer wall 21 of the container 20 to regulate strain of the outer wall 21. The outer walls 21A and 21C of the container can be suppressed from being positionally displaced with respect to the ribs 61A and 61C of the lid member 50. The outer walls 21 of the container 20 and the ribs 61 of the lid member 50 can be thus joined securely.

As shown in FIG. 7, the vertical surfaces 76b in the lead-acid battery 10 are each formed at the position distant by the distance D3 from the lower surface of the rib 61A in the extending direction (the Y direction in FIG. 7) of the outer wall 21. The vertical surface 76b thus comes into contact with the outer wall 21 of the container 20 at a position distant from the distal end. The portion at such a position distant from the distal end of the outer wall of the container 20 is low in temperature and the material at the position is hard even upon thermal welding. The portion of which material is hard comes into contact, and strain of the outer wall 21A can be thus regulated reliably.

The lead-acid battery 10 includes the strain regulating pieces that are formed inside the outer peripheral walls 55 of the lid member 50. The strain regulating pieces 75 are thus hidden by the outer peripheral walls 55 of the lid member 50 and are not exposed outside. The strain regulating pieces 75 are less likely to be damaged by interfering with a different component or the like during assembly work and delivery, for example. The strain regulating pieces 75 are formed integrally with the lid member 50 and are thus less likely to be detached.

The strain regulating pieces 75 of the lead-acid battery 10 each have the vertical surface 76b and the slant surfaces 76a and 76c. The single strain regulating piece 75 can thus regulate strain of the container 20 as well as position the container 20 with respect to the lid member 50. Furthermore, the slant surface 76a is provided below the vertical surface 76b in the present example. The vertical surface 76b is thus provided therebelow with no edge to be engaged with the distal end of the outer wall of the container 20 upon assembling. The lid member 50 and the container 20 can be assembled smoothly.

As shown in FIG. 7, the strain regulating pieces 75 are formed to extend over both surfaces of the outer peripheral wall 55A and the base portion 51 of the lid member 50. The strain regulating piece 75 extending over the both surfaces is less likely to fall when the outer wall 21 of the container 20 comes into contact with the vertical surface 76b.

The two outer walls 21A and 21C located at the respective ends in the X direction out of the four outer walls 21A to 21D configuring the container 20 are parallel to the partitions 23 as shown in FIG. 2. The outer walls 21A and 21C are more likely to be strained than the two outer walls 21B and 21D connected with the partitions 23. The lead-acid battery 10 includes the strain regulating pieces 75 correspondingly to the two outer walls 21A and 21C that are likely to be strained. The strain regulating pieces 75 are thus located at preferred positions.

<Embodiment 2>

The embodiment 2 of the present invention is described next with reference to FIG. 9.

The strain regulating pieces 75 were provided inside the outer peripheral walls 55 of the lid member 50 in the embodiment 1. The vertical surface 76b of each of the strain regulating pieces 75 was made in contact with the outer wall 21 of the container 20 upon thermal welding. The lead-acid battery was thus structured to regulate strain of the container 20.

The configuration according to the embodiment 2 is reversed from the configuration according to the embodiment 1, and the outer wall 21 of the container 20 is provided with a strain regulating piece 100. As shown in FIG. 9, the strain regulating piece 100 protrudes from the outer wall 21 of the container 20 toward the outer surface wall 55A of the lid member 50. The strain regulating piece 100 has a vertical distal end surface 110 that parallelly faces the outer peripheral wall 55A of the lid member 50 with a predetermined distance being provided therebetween.

When the outer wall 21 of the container 20 is strained by bulging outward in the embodiment 2, the distal end surface 110 of the strain regulating piece 100 formed on the outer wall 21A comes into contact with the outer peripheral wall 55A of the lid member 50 from inside, to regulate strain of the outer wall 21 of the container 20. Similarly to the embodiment 1, the outer walls 21A and 21C of the container can be suppressed from being positionally displaced with respect to the ribs 61A and 61C of the lid member 50. The outer walls 21 of the container 20 and the ribs 61 of the lid member 50 can be thus joined securely.

Figure 9:
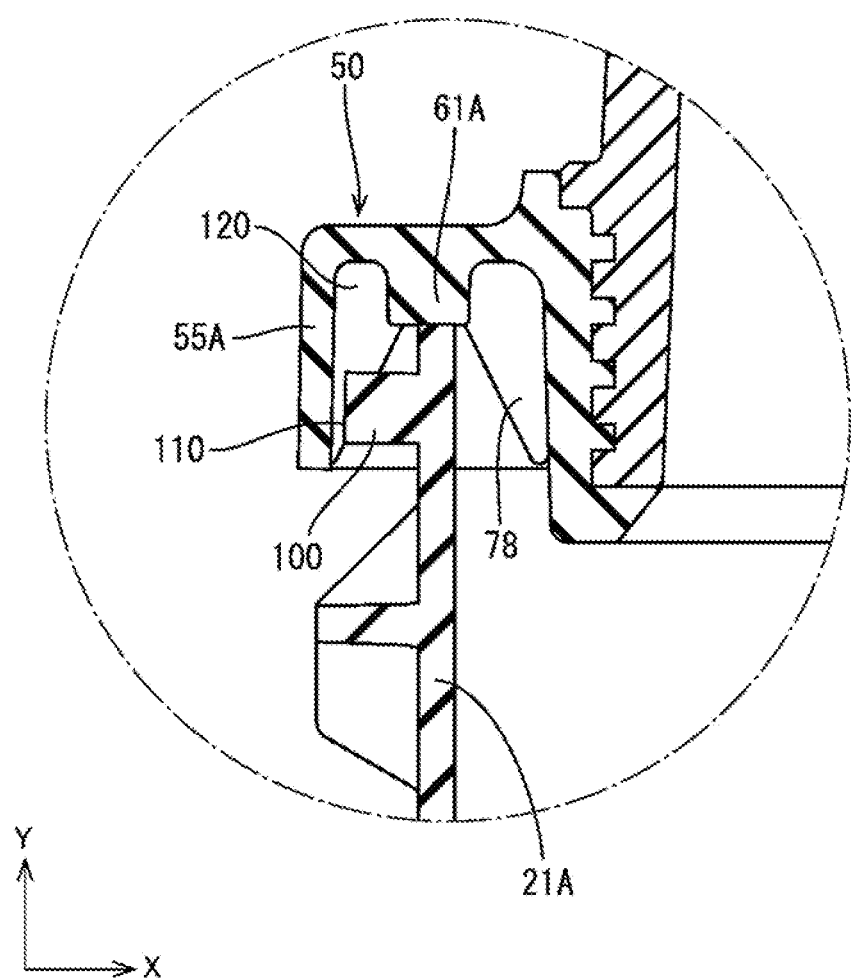
FIG. 9 is an enlarged view of a joint portion between a container and a lid member and its peripheral according to an embodiment 2 of the present invention.

Reference numeral 120 indicated in FIG. 9 denotes a guide piece that corresponds to the second slant surface 76c according to the embodiment 1. The guide piece 120 and the guide piece 78 formed oppositely with respect to the rib 61 form a guide groove that has a V shape and guides the outer wall 21 of the container 20 to the rib 61 of the lid member 50. The guide piece 120 has a function of positioning the outer wall 21 with respect to the rib 61 upon assembling. When the strain regulating pieces 100 are provided on the outer wall 21 of the container 20, the guide pieces 120 and the strain regulating pieces 100 can be formed alternately in the Z direction (the direction perpendicular to the sheet of FIG. 9) so that the guide pieces 120 and the strain regulating pieces 100 do not interfere with each other.

<Other Embodiments>

The present invention is not limited to the embodiments described above and illustrated in the drawings. The following exemplary embodiments are also included in the technical scope of the present invention.

(1) The above embodiments exemplarily described the "strain regulating pieces 76 and 100" as the "spacer" according to the present invention. The embodiment 1 exemplified the case where the strain regulating piece 76 is formed integrally with the outer peripheral wall 55 of the lid member 50. The embodiment 2 exemplified the case where the strain regulating piece 100 is formed integrally with the outer wall 21 of the container 20. The "spacer" has only to be configured to "fill" or "decrease" the space G between the outer wall 21 of the container 20 and the outer peripheral wall 55 of the lid member 50, and is not limited to the configurations exemplified in the embodiments 1 and 2. For example, the "spacer" can be provided, between the outer wall 21 and the outer peripheral wall 55, as a spacer (a member separate from the container and the lid member) which "fills" or "decreases" the space G therebetween. When the container 20 is strained by bulging outward in this case, the spacer comes into contact with both of the outer wall 21 of the container 20 and the outer peripheral wall 55 of the lid member 50 to support the both, and can thus suppress strait of the container 20.

(2) The embodiment 1 exemplified the strain regulating piece 76 in the plate shape. The strain regulating piece 76 can have a pillar shape or a projection shape instead of the plate shape. In short, the strain regulating piece 76 has only to come into contact with the outer wall 21 to suppress strain when the container 20 is strained by bulging outward. The contact surface 76c of the strain regulating portion 76 is preferably perpendicular to the strain direction of the outer wall 21, while the contact surface 76c is not necessarily perpendicular but has only to have a similar shape. Similarly, the strain regulating piece 100 according to the embodiment 2 can have a pillar shape or a projection shape.

(3) The embodiment 1 exemplified the case where the vertical surface 76b is provided vertically below the end edge 62 of the rib 61A. The vertical surface 76b has only to be formed in the width (the H dimension in FIG. 8) of the rib 61A and can be provided inward relative to the end edge 62.

(4) The embodiment 1 exemplified the case where the strain regulating pieces 75 are provided on the two outer peripheral walls 55A and 55C located at the respective ends in the X direction out of the outer peripheral walls 55A to 55D of the lid member 50. The strain regulating pieces 75 can be provided on the two outer peripheral walls 55B and 55D located at the respective ends in the Z direction in addition to the two outer peripheral walls 55A and 55C located at the respective ends in the X direction.

(5) The embodiment 1 exemplified the case where the outer walls 21 of the container 20 and the ribs 61 of the lid member 50 are heated with an iron plate so as to be welded. The welding method is not limited to the method with use of the heated iron plate, but the outer walls 21 of the container 20 and the ribs 61 of the lid member 50 can be welded by means of an ultrasonic wave, a high frequency, a semiconductor laser, or the like.

What is claimed is:

1. A lead-acid battery comprising:
a power generating element,
a container comprising an outer wall and a bottom wall and accommodating the power generating element;
a lid member having a rib, a lowermost end surface of the rib, in a direction in which the outer wall extends from the bottom wall, being in direct contact with an uppermost end surface of the outer wall of the container, in the direction in which the outer wall extends from the bottom wall, and sealing an opening of the container;
an outer peripheral wall provided at the lid member, located to be spaced apart from the rib, and surrounding the outer wall of the container; and
a spacer located between the outer wall of the container and the outer peripheral wall of the lid member, wherein the spacer is in direct contact with a surface of the outer peripheral wall of the lid member.

2. The lead-acid battery according to claim 1, wherein the spacer is configured to contact the outer wall of the container when the container is strained by bulging outward.

3. The lead-acid battery according to claim 1, wherein the container includes a plurality of cell chambers aligned in a certain direction and divided by a partition, and the spacer is provided correspondingly to the outer wall at each end in the certain direction of the container.

4. The lead-acid battery according to claim 1, wherein the outer wall of the container and the rib of the lid member are welded to be joined to each other, the spacer has a contact portion configured to contact the outer wall of the container, and the contact portion is provided at a position distant from a joint portion between the outer wall of the container and the rib in the direction in which the outer wall extends from the bottom wall.

5. The lead-acid battery according to claim 1, wherein the spacer has a contact portion configured to contact the outer wall of the container, and the contact portion is provided in a width of the rib.

6. The lead-acid battery according to claim 1, wherein the spacer has end surfaces facing the outer wall of the container, the end surfaces includes a plurality of surfaces having different angles in the extending direction of the outer wall of the container, and the plurality of surfaces includes:
a contact surface configured to contact the outer wall of the container; and
a slant surface having an angle different from an angle of the contact surface and slanted toward the rib.

7. The lead-acid battery according to claim 6, wherein the slant surface has a first end connected to the contact surface, and
the slant surface has a second end connected to a surface of the rib joined to the outer wall.

8. A method of manufacturing the lead-acid battery according to claim 1, the method comprising:
providing the container and the lid member having the rib and the outer peripheral wall, wherein the spacer is in direct contact with the surface of the outer peripheral wall of the lid member, and subsequently
welding to join the outer wall of the provided container and the rib of the provided lid member.

9. The lead-acid battery according to claim 1, wherein the spacer is provided between the rib and the outer peripheral wall of the lid member; and
an upper end surface of the spacer is in direct contact with a lower surface of the lid member.

10. The lead-acid battery according to claim 1, wherein a width of the rib in a direction parallel to an upper surface of the bottom wall is larger than a width of the outer wall of the container in the direction parallel to the upper surface of the bottom wall.

11. The lead-acid battery according to claim 10, wherein the spacer has a projection on a side surface of the spacer; and
an upper surface of the projection of the spacer is in direct contact with the lower surface of the rib.

12. A lead-acid battery comprising:
a power generating element,
a container comprising an outer wall and a bottom wall and accommodating the power generating element;
a lid member having a rib, a lowermost end surface of the rib, in a direction in which the outer wall extends from the bottom wall, being in direct contact with an uppermost end surface of the outer wall of the container, in the direction in which the outer wall extends from the bottom wall, and sealing an opening of the container;
an outer peripheral wall provided at the lid member, located to be spaced apart from the rib, and surrounding the outer wall of the container; and
a spacer located between the outer wall of the container and the outer peripheral wall of the lid member,
wherein the spacer has a flat distal end surface that is parallel to the direction in which the outer wall extends from the bottom wall.

13. The lead-acid battery according to claim 12, wherein the spacer is provided on the outer wall of the container and is configured to contact the outer peripheral wall of the lid member when the container is strained by bulging outward.

14. The lead-acid battery according to claim 12, wherein the container includes a plurality of cell chambers aligned in a certain direction and divided by a partition, and the spacer is provided correspondingly to the outer wall at each end in the certain direction of the container.

15. The lead-acid battery according to claim 12, wherein the outer wall of the container and the rib of the lid member are welded to be joined to each other,
the flat distal end surface of the spacer is configured to contact the outer peripheral wall of the lid member, and
the flat distal end surface is provided at a position distant from a joint portion between the outer wall of the container and the rib in the direction in which the outer wall extends from the bottom wall.

16. The lead-acid battery according to claim 12, wherein the spacer is provided inside the outer peripheral wall of the lid member.

17. The lead-acid battery according to claim 12, wherein the flat distal end surface is provided in a width of the rib.

18. A method of manufacturing the lead-acid battery according to claim 12, the method comprising:
providing the container and the lid member having the rib and the outer peripheral wall, wherein the spacer has the flat distal end surface that is parallel to the direction in which the outer wall extends from the bottom wall, and subsequently
welding to join the outer wall of the provided container and the rib of the provided lid member.

19. The lead-acid battery according to claim 12, wherein a width of the rib in a direction parallel to an upper surface of the bottom wall is larger than a width of the outer wall of the container in the direction parallel to the upper surface of the bottom wall.

20. The lead-acid battery according to claim 12, wherein wherein the spacer has a quadrilateral cross-section shape perpendicular to the direction in which the outer wall extends from the bottom wall.

\* \* \* \* \*